United States Patent
Kasai (10) Patent No.: US 12,480,695 B2
(45) Date of Patent: Nov. 25, 2025

(54) REFRIGERATION CYCLE APPARATUS

(71) Applicant: Mitsubishi Electric Corporation, Tokyo (JP)

(72) Inventor: Kohei Kasai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 934 days.

(21) Appl. No.: 17/420,118

(22) PCT Filed: Mar. 6, 2019

(86) PCT No.: PCT/JP2019/008810
§ 371 (c)(1),
(2) Date: Jun. 30, 2021

(87) PCT Pub. No.: WO2020/179005
PCT Pub. Date: Sep. 10, 2020

(65) Prior Publication Data
US 2022/0057122 A1    Feb. 24, 2022

(51) Int. Cl.
*F25B 41/26* (2021.01)
*F25B 13/00* (2006.01)

(52) U.S. Cl.
CPC .............. *F25B 41/26* (2021.01); *F25B 13/00* (2013.01)

(58) Field of Classification Search
CPC .......... F25B 41/26; F25B 13/00; F25B 49/02; F25B 2313/003; F25B 2313/0314;
(Continued)

(56) References Cited

U.S. PATENT DOCUMENTS

2009/0199581 A1* 8/2009 Ushijima et al. ....... F25B 30/02
62/238.7
2013/0098092 A1* 4/2013 Wakamoto et al. .... F25B 13/00
62/278
(Continued)

FOREIGN PATENT DOCUMENTS

CN        101749805 B  * 11/2014 .......... F24F 2110/00
EP        2 924 375 A1    9/2015
(Continued)

OTHER PUBLICATIONS

KR 20180069382 A Translation (Year: 2018).*
(Continued)

*Primary Examiner* — Jerry-Daryl Fletcher
*Assistant Examiner* — Dario Antonio Deleon
(74) *Attorney, Agent, or Firm* — POSZ LAW GROUP, PLC (57) ABSTRACT

A refrigeration cycle apparatus includes; an air heat exchanger; a first expansion valve; a water heat exchanger; a flow passage switching device provided to a discharge part of a compressor; an injection pipe branched from a branch portion of a refrigerant pipe connecting the water heat exchanger with the first expansion valve, and is connected to an injection port of the compressor; a second expansion valve provided to the injection pipe; and an internal heat exchanger configured to exchange heat between refrigerant flowing between the water heat exchanger and the branch portion and refrigerant flowing from the second expansion valve and the injection pipe. The branch portion is provided downstream of the internal heat exchanger and upstream of the first expansion valve in a flow direction of the refrigerant when the flow passage switching device is operated in the first state.

10 Claims, 6 Drawing Sheets

(58) Field of Classification Search
CPC .......... F25B 2400/13; F25B 2700/1931; F25B 2700/21152

See application file for complete search history.

(56) References Cited

U.S. PATENT DOCUMENTS

| | | | | |
|---|---|---|---|---|
| 2015/0040595 | A1* | 2/2015 | Tamaki et al. .... | F25B 2313/031 |
| | | | | 62/159 |
| 2016/0273816 | A1* | 9/2016 | Horiuchi .......... | F25B 2313/031 |
| 2017/0268811 | A1* | 9/2017 | Ochiai et al. ........... | F25B 49/02 |
| 2019/0011148 | A1* | 1/2019 | Matsuda et al. ........ | F25B 13/00 |
| 2019/0360725 | A1* | 11/2019 | Kondou .................. | F25B 49/02 |
| 2020/0355419 | A1* | 11/2020 | Tomiyama .............. | F25B 13/00 |

FOREIGN PATENT DOCUMENTS

| | | | | | |
|---|---|---|---|---|---|
| EP | 3 130 868 | A1 | | 2/2017 | |
| JP | 2007-278686 | A | | 10/2007 | |
| JP | 2012-189238 | A | | 10/2012 | |
| JP | 5042058 | B2 | | 10/2012 | |
| JP | 2014-105891 | A | | 6/2014 | |
| JP | 5901598 | B2 | | 4/2016 | |
| JP | 2017036882 | A | * | 2/2017 | ............ F25B 47/025 |
| JP | 2017141998 | A | * | 8/2017 | ............. Y02B 30/70 |
| JP | 2018021730 | A | * | 2/2018 | ................. F25B 1/00 |
| JP | 6400223 | B2 | * | 10/2018 | ................. F25B 1/00 |
| KR | 20180069382 | A | * | 6/2018 | ........ F25B 2700/211 |
| WO | 2014/080612 | A1 | | 5/2014 | |
| WO | 2017064755 | A1 | | 4/2017 | |

OTHER PUBLICATIONS

JP 2018021730 A Translation (Year: 2018).*
JP 2017141998 A Translation (Year: 2017).*
JP 6400223 B2 Translation (Year: 2018).*
JP 2017036882 A Translation (Year: 2017).*
CN 101749805 B Translation (Year: 2014).*
Office Action dated Sep. 9, 2022 issued in corresponding CN patent application No. 201980093484.X (and English machine translation).
International Search Report of the International Searching Authority mailed May 28, 2019 for the corresponding International application No. PCT/JP2019/008810 (and English translation).
Office Action dated May 10, 2022 issued in corresponding JP Patent Application No. 2021-503328 (and English translation).
Office Action dated Jun. 2, 2022 issued in corresponding CN Patent Application No. 201980093484.X (and English translation).

* cited by examiner

Comparative Example

FIG. 4

Comparative Example

REFRIGERATION CYCLE APPARATUS

CROSS REFERENCE TO RELATED APPLICATION

This application is a U.S. national stage application of International Application No. PCT/JP2019/008810, filed on Mar. 6, 2019, the contents of which are incorporated herein by reference.

TECHNICAL FIELD

The present disclosure relates to a refrigeration cycle apparatus including a water heat exchanger.

BACKGROUND

There has been known a refrigeration cycle apparatus including a water heat exchanger that causes water and refrigerant cycling through a refrigeration cycle circuit to exchange heat with each other. For example, Patent Literature 1 discloses a refrigeration cycle circuit where a compressor, a four-way valve, a water heat exchanger, a first pressure reducing device, and an air heat exchanger are connected by a pipe. In this refrigeration cycle circuit of Patent Literature 1, a medium pressure receiver, used as a first internal heat exchanger, is provided between the water heat exchanger and the first pressure reducing device. Heat exchange is performed, in the medium pressure receiver, between refrigerant flowing between the water heat exchanger and the first pressure reducing device and refrigerant flowing between the air heat exchanger and the compressor. The refrigeration cycle circuit is provided with an injection circuit that is branched from between the medium pressure receiver and the first pressure reducing device to inject refrigerant into the compressor via a second pressure reducing device. The refrigeration cycle circuit is also provided with a second internal heat exchanger that causes refrigerant flowing between the medium pressure receiver and the first pressure reducing device and refrigerant flowing between the second pressure reducing device and the compressor in the injection circuit to exchange heat with each other. As described above, in Patent Literature 1, two-phase gas-liquid refrigerant that flows into the medium pressure receiver, used as the first internal heat exchanger, is caused to exchange heat with refrigerant at a suction part of the compressor and is thus changed into liquid refrigerant. This liquid refrigerant is branched into the injection circuit.

PATENT LITERATURE

Patent Literature 1: Japanese Patent No. 5042058

In Patent Literature 1, the refrigerant liquefied by the medium pressure receiver is caused to flow into the injection circuit and hence, the amount of refrigerant caused to flow into the injection port of the compressor is stably controlled by regulating the opening degree of an electronic expansion valve that is the second pressure reducing device. However, to simplify the structure of the refrigeration cycle apparatus, there has been a demand for a refrigeration cycle apparatus that stably controls the amount of refrigerant caused to flow into the injection port of the compressor without using the medium pressure receiver.

SUMMARY

The present disclosure has been made to solve the above-described problem, and it is an object of the present disclosure to provide a refrigeration cycle apparatus that improves stability of control of the amount of refrigerant that is caused to flow into the injection port of the compressor without using the medium pressure receiver.

A refrigeration cycle apparatus according to an embodiment of the present disclosure includes a compressor having an injection port, and configured to discharge refrigerant compressed; an air heat exchanger configured to cause air and the refrigerant to exchange heat with each other; a first expansion valve; a water heat exchanger configured to cause water and the refrigerant to exchange heat with each other; a flow passage switching device provided to a discharge part of the compressor, and configured to be switched between a first state in which the refrigerant discharged from the compressor is caused to flow into the water heat exchanger and a second state in which the refrigerant discharged from the compressor is caused to flow into the air heat exchanger; an injection pipe branched from a branch portion of a refrigerant pipe connecting the water heat exchanger with the first expansion valve, the injection pipe being connected to the injection port; a second expansion valve provided to the injection pipe; and an internal heat exchanger configured to cause the refrigerant flowing between the water heat exchanger and the branch portion and the refrigerant flowing out from the second expansion valve and flowing through the injection pipe to exchange heat with each other. The branch portion is provided downstream of the internal heat exchanger and upstream of the first expansion valve in a flow direction of the refrigerant when the flow passage switching device is operated in the first state.

According to an embodiment of the present disclosure, refrigerant branched from a position downstream of the internal heat exchanger in the flow direction of refrigerant in the operation state in which refrigerant discharged from the compressor is caused to flow into the water heat exchanger is caused to flow into the injection pipe. That is, refrigerant flowing through the internal heat exchanger from the water heat exchanger toward the first expansion valve is caused to exchange heat with refrigerant reduced in pressure by the second expansion valve of the injection pipe, and is thus liquefied, and this liquefied refrigerant flows into the injection pipe. The liquid refrigerant is caused to flow into the injection pipe and hence, it is possible to stably control the amount of refrigerant caused to flow into the injection port of the compressor by using the second expansion valve.

DETAILED DESCRIPTION

Hereinafter, the description will be made for embodiments where a refrigeration cycle apparatus according to the present disclosure is applied to an air-conditioning apparatus. The present disclosure is not limited to the following embodiments, and various modifications are applicable unless a refrigeration cycle apparatus thus modified departs from the gist of the present disclosure. Further, the present disclosure includes any combination of combinable configurations among configurations shown in the following embodiments. In the drawings, elements given the same reference signs are identical or corresponding elements, and the same reference signs are common through the entire specification. In the drawings, the relative size relationships, shapes, and other aspects of elements may differ from those of actual elements.

Embodiment 1

Figure 1:
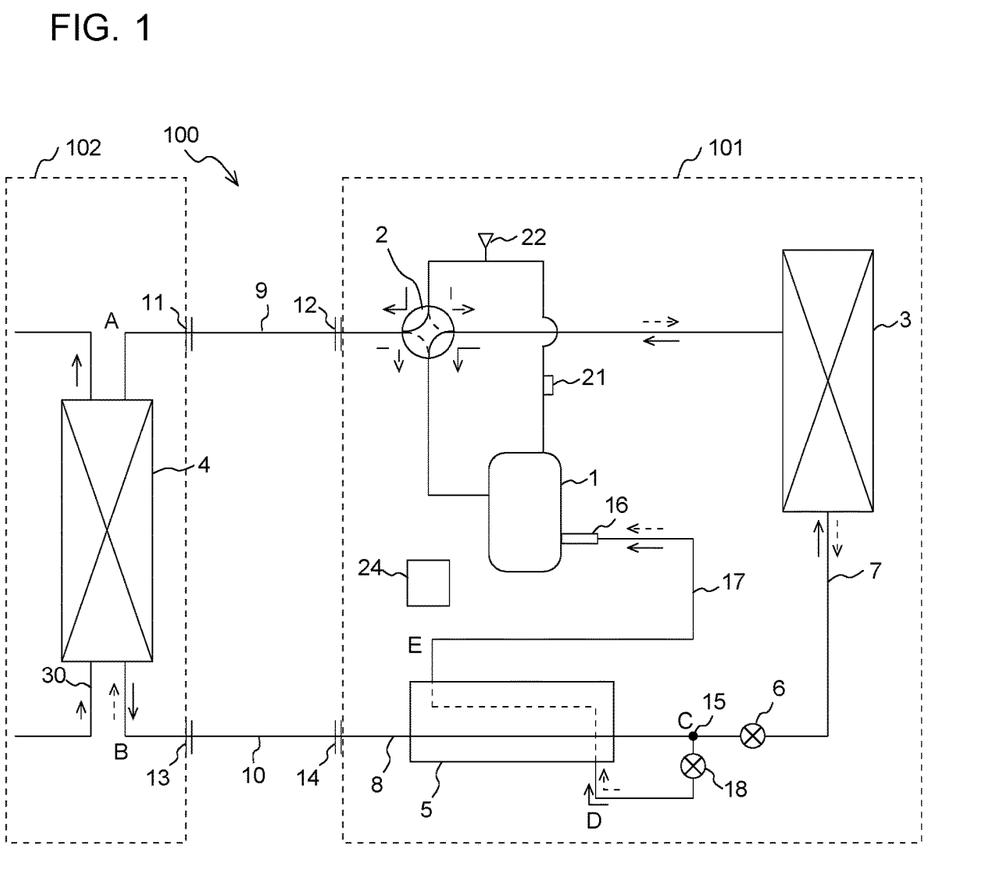
FIG. 1 is a configuration diagram of a refrigeration cycle apparatus 100 according to Embodiment 1.

FIG. 1 is a configuration diagram of a refrigeration cycle apparatus 100 according to Embodiment 1. The refrigeration cycle apparatus 100 includes a compressor 1, a flow passage switching device 2, an air heat exchanger 3, a first expansion valve 6, an internal heat exchanger 5, and a water heat exchanger 4, and these components are connected by a refrigerant pipe 7. The compressor 1 has an injection port 16. An injection pipe 17 is connected to the injection port 16. The injection pipe 17 is branched from a branch portion 15 disposed between the internal heat exchanger 5 and the first expansion valve 6. A second expansion valve 18 is provided to the injection pipe 17. The refrigeration cycle apparatus 100 also includes a controller 24, a temperature sensor 21, and a pressure sensor 22. The controller 24 is configured to control the compressor 1, the flow passage switching device 2, the first expansion valve 6, and the second expansion valve 18.

The water heat exchanger 4 is installed in an air-conditioned space in a state in which the water heat exchanger 4 is accommodated in an indoor unit 102. The compressor 1, the flow passage switching device 2, the air heat exchanger 3, the first expansion valve 6, and the internal heat exchanger 5 are accommodated in an outdoor unit 101. The entire pipe through which refrigerant flows in the refrigeration cycle apparatus 100 is collectively referred to as the refrigerant pipe 7. Of the refrigerant pipe 7, a pipe that connects the water heat exchanger 4 and the first expansion valve 6 with each other is distinguished, and is referred to as a first refrigerant pipe 8. The outdoor unit 101 may be installed at a place separated from the indoor unit 102 including the water heat exchanger 4, which is installed in an air-conditioned space, such as a room. Of the refrigerant pipe 7, pipes that connect the indoor unit 102 and the outdoor unit 101 with each other are referred to as an extension pipe 9 and an extension pipe 10. The extension pipe 9 is a portion of the refrigerant pipe 7, and connects the flow passage switching device 2 and the water heat exchanger 4 with each other. The extension pipe 10 is a portion of the refrigerant pipe 7, and connects the water heat exchanger 4 and the internal heat exchanger 5 with each other. The extension pipe 9 is connected to the indoor unit 102 via a joint 11, and is connected to the outdoor unit 101 via a joint 12. The extension pipe 10 is connected to the indoor unit 102 via a joint 13, and is connected to the outdoor unit 101 via a joint 14.

The rotational speed of the compressor 1 is controlled by a signal with a driving frequency output from the controller 24. The compressor 1 compresses and discharges suctioned refrigerant. The compressor 1 has the injection port 16 communicating with an inside of a compression chamber.

The flow passage switching device 2 is a device formed by combining a plurality of valves, and switches a direction in which refrigerant flows by changing the opening and closing states of the plurality of valves. The flow passage switching device 2 is switchable between a first state and a second state. The first state is a state in which refrigerant discharged from the compressor 1 is caused to flow into the water heat exchanger 4 and the second state is a state in which the refrigerant discharged from the compressor 1 is caused to flow into the air heat exchanger 3. When the flow passage switching device 2 is in the first state, a flow passage is formed through which refrigerant flowing out from the air heat exchanger 3 is suctioned into the compressor 1.

When the flow passage switching device 2 is in the second state, a flow passage is formed through which refrigerant flowing out from the water heat exchanger 4 is suctioned into the compressor 1. In FIG. 1, the flow of refrigerant in the first state is shown by solid line arrows, and the flow of refrigerant in the second state is shown by broken line arrows.

The air heat exchanger 3 causes refrigerant and air to exchange heat with each other. A fan is provided in the vicinity of the air heat exchanger 3, and air is sent to the air heat exchanger 3 from the fan. When the flow passage switching device 2 is in the first state, the air heat exchanger 3 is used as an evaporator for refrigerant. When the flow passage switching device 2 is in the second state, the air heat exchanger 3 is used as a condenser for refrigerant.

The first expansion valve 6 causes refrigerant to expand to reduce the pressure of the refrigerant. The opening degree of the first expansion valve 6 is adjustable.

The first expansion valve 6 may be an electronically controlled expansion valve, for example.

The water heat exchanger 4 causes water flowing through a water pipe 30 and refrigerant to exchange heat with each other. The water pipe 30 is a pipe through which water used for indirect air conditioning, such as floor heating, flows. The water heat exchanger 4 in Embodiment 1 is used as a heat source that supplies heating energy or cooling energy for the indirect air conditioning. When the flow passage switching device 2 is in the first state, the water heat exchanger 4 is used as a condenser for refrigerant. When the flow passage switching device 2 is in the second state, the water heat exchanger 4 is used as an evaporator for refrigerant.

The internal heat exchanger 5 causes refrigerant flowing through the first refrigerant pipe 8 and refrigerant flowing through a portion of the injection pipe 17 downstream of the second expansion valve 18 to exchange heat with each other.

The injection pipe 17 is a pipe branched from the branch portion 15 disposed at the first refrigerant pipe 8 and between the internal heat exchanger 5 and the first expansion valve 6. The injection pipe 17 is connected to the injection port 16 of the compressor 1. When the flow passage switching device 2 is in the first state, that is, in the operation state in which the water heat exchanger 4 is used as the condenser for refrigerant, the branch portion 15 is located downstream of the internal heat exchanger 5 and upstream of the first expansion valve 6. When the flow passage switching device 2 is in the second state, that is, in the operation state in which the air heat exchanger 3 is used as the condenser for refrigerant, the branch portion 15 is located downstream of the first expansion valve 6 and upstream of the internal heat exchanger 5.

The second expansion valve 18 causes refrigerant to expand to reduce the pressure of the refrigerant. The opening degree of the second expansion valve 18 is adjustable. The second expansion valve 18 may be an electronically controlled expansion valve, for example. The second expansion valve 18 is provided to the injection pipe 17 and upstream of the internal heat exchanger 5 in the flow direction of refrigerant, that is, at a position between the internal heat exchanger 5 and the branch portion 15.

The temperature sensor 21 is provided to the refrigerant pipe 7 and is provided to a discharge part of the compressor 1. The temperature sensor 21 detects the temperature of refrigerant discharged from the compressor 1.

The pressure sensor 22 is provided to the refrigerant pipe 7 and is provided to the discharge part the compressor 1. The pressure sensor 22 detects the pressure of refrigerant discharged from the compressor 1.

The controller 24 controls the driving frequency of the compressor 1, the opening degree of the first expansion valve 6, and the opening degree of the second expansion valve 18. The controller 24 is dedicated hardware or a microcomputer including a memory that stores a program and control data and a central processing unit (CPU) that executes the program. In the case where the controller 24 is a dedicated hardware, the controller 24 corresponds to a single circuit, a composite circuit, an application specific integrated circuit (ASIC), a field-programmable gate array (FPGA), or the combination of these circuits, for example. Function units included in the controller 24 may be each individual hardware, or the function units may be included in one hardware.

A detected value from the temperature sensor 21 and a detected value from the pressure sensor 22 are input into the controller 24. The controller 24 obtains the high pressure saturation temperature of refrigerant on the basis of the pressure, detected by the pressure sensor 22, of discharged refrigerant from the compressor 1. Then, the controller 24 obtains the degree of discharge superheat SHd of refrigerant, which is calculated as the difference between the high pressure saturation temperature and the temperature, detected by the temperature sensor 21, of the discharged refrigerant from the compressor 1. The controller 24 controls the opening degree of the second expansion valve 18 on the basis of the degree of discharge superheat SHd.

Next, the summary of the action of the refrigeration cycle apparatus 100 will be described. The refrigeration cycle apparatus 100 performs a heating operation and a defrosting operation. It is more preferable that the refrigeration cycle apparatus 100 also perform a cooling operation.

<Heating Operation>

The flow of refrigerant during the heating operation is shown by solid line arrows in FIG. 1. The flow passage switching device 2 is switched to the first state during the heating operation. Hereinafter, an action performed when refrigerant is injected into the compressor 1 will be described.

Gas refrigerant at high temperature and high pressure discharged from the compressor 1 passes through the flow passage switching device 2 and the extension pipe 9, and then flows into a refrigerant flow passage of the water heat exchanger 4. The water heat exchanger 4 is used as the condenser during the heating operation. That is, in the water heat exchanger 4, heat exchange is performed between refrigerant flowing through the refrigerant flow passage and water flowing through the water pipe 30, and condensation heat of the refrigerant is transferred to the water. With such transfer of heat, the refrigerant flowing through the refrigerant flow passage of the water heat exchanger 4 condenses, thus becoming liquid refrigerant at high pressure. Further, the water flowing through a water flow passage of the water heat exchanger 4 is heated by heat transferred from the refrigerant.

The refrigerant at high pressure, which is condensed in the water heat exchanger 4, passes through the extension pipe 10, and then flows into the internal heat exchanger 5. In Embodiment 1, the branch portion 15 of the first refrigerant pipe 8 is located downstream of the internal heat exchanger 5 in the flow direction of refrigerant in the heating operation, and the injection pipe 17 is branched from the branch portion 15. Refrigerant that flows into the injection pipe 17 is reduced in pressure by the second expansion valve 18, thus becoming two-phase gas-liquid refrigerant, and flows into the internal heat exchanger 5. In the internal heat exchanger 5, refrigerant flowing through the first refrigerant pipe 8 toward the branch portion 15 exchanges heat with the two-phase gas-liquid refrigerant, reduced in pressure by the second expansion valve 18, and is thus subcooled and hence brought into a liquid state. That is, the refrigerant discharged from the water heat exchanger 4 and flowing into the internal heat exchanger 5 through the first refrigerant pipe 8 exchanges heat with the refrigerant reduced in pressure by the second expansion valve 18, in the internal heat exchanger 5, and is thus brought into a liquid state, and the refrigerant in the liquid state flows into the injection pipe 17.

It is possible to cause the refrigerant in the liquid state to flow into the second expansion valve 18 of the injection pipe 17 and hence, the amount of refrigerant discharged from the second expansion valve 18 is stably controllable. For example, in the case where refrigerant flowing into the second expansion valve 18 from the injection pipe 17 is in a two-phase gas-liquid state, the amount of refrigerant discharged from the second expansion valve 18 may fluctuate depending on the ratio between gas phase and liquid phase. However, according to Embodiment 1, refrigerant in the liquid state flows into the second expansion valve 18 and hence, the expected amount of refrigerant corresponding to the opening degree of the second expansion valve 18 is allowed to be discharged from the second expansion valve 18.

The two-phase gas-liquid refrigerant discharged from the second expansion valve 18 exchanges heat with refrigerant in the internal heat exchanger 5 and hence, quality of the refrigerant rises. The two-phase gas-liquid refrigerant flows through the injection pipe 17 and flows out from the internal heat exchanger 5, and flows into the compression chamber of the compressor 1 from the injection port 16. The compressor 1 is cooled by the two-phase refrigerant flowing into the compressor 1 from the injection port 16. However, the injected refrigerant is refrigerant having high quality and hence, it is possible to increase the amount of refrigerant cycling through the water heat exchanger 4 while the excessive lowering of the discharge temperature of the compressor 1 is reduced. With such a configuration, it is possible to obtain high heating capacity.

Refrigerant that flows through the first refrigerant pipe 8 toward the first expansion valve 6 without flowing into the injection pipe 17 is reduced in pressure by the first expansion valve 6, thus becoming two-phase refrigerant at low pressure, and flows into the air heat exchanger 3. The air heat exchanger 3 is used as an evaporator during the heating operation. The refrigerant flowing through the air heat exchanger 3 exchanges heat with air around the air heat exchanger 3, and evaporation heat of the refrigerant is removed from the air. With such removal of evaporation heat, the refrigerant that flows into the air heat exchanger 3 evaporates, thus becoming gas refrigerant at low pressure. The gas refrigerant at low pressure passes through the flow passage switching device 2, and then is suctioned into the compressor 1.

The refrigerant suctioned into the compressor 1 merges with refrigerant that flows into the compressor 1 from the injection port 16, and the refrigerant is compressed, thus becoming gas refrigerant at high temperature and high pressure. The above-described cycle is continuously repeated during the heating operation.

For example, when a high load heating operation with a target water temperature of approximately 50 degrees C. is performed in an environment with a low outside air temperature of approximately −15 degrees C., the temperature of refrigerant discharged from the compressor 1 is increased. When the temperature of discharged refrigerant is increased and exceeds 120 degrees C., for example, strength of the compressor 1 and strength of resin components and metal components forming parts disposed around the compressor 1 may be lowered. To ensure reliability of the refrigeration cycle apparatus 100 by avoiding such a phenomenon, it is preferable to return refrigerant having quality of less than 1 to a suction part of the compressor 1. In Embodiment 1, in the internal heat exchanger 5, refrigerant flowing through the first refrigerant pipe 8 toward the air heat exchanger 3 is subcooled by refrigerant reduced in pressure by the second expansion valve 18 of the injection pipe 17. That is, the subcooled refrigerant is supplied to the air heat exchanger 3, which is used as the evaporator. Therefore, it is possible to improve temperature efficiency of the air heat exchanger 3, which is used as the evaporator. The refrigerant is injected into the compressor 1 and hence, excessive rising of the discharge temperature of refrigerant from the compressor 1 is reduced, and refrigerant having quality of approximately 1 is allowed to be returned to the suction part of the compressor 1.

<Defrosting Operation>

Frost may adhere to the surface of the air heat exchanger 3, which is used as the evaporator during the heating operation. In particular, in the case where the air heat exchanger 3 is disposed outside, when the temperature of outside air is low, frost is likely to adhere to the air heat exchanger 3. Adhesion of frost to the air heat exchanger 3 causes the lowering of heating capacity and the lowering of the coefficient of performance. The defrosting operation is an operation performed to melt frost adhering to the surface of the air heat exchanger 3 to avoid such a phenomenon. The flow of refrigerant during the defrosting operation is shown by broken line arrows in FIG. 1. During the defrosting operation, the flow passage switching device 2 is switched to the second state, and an operation in a cycle called as a reverse cycle is performed. Hereinafter, an action performed when refrigerant is injected into the compressor 1 will be described.

Gas refrigerant at high temperature and high pressure discharged from the compressor 1 passes through the flow passage switching device 2, and then flows into the air heat exchanger 3. The air heat exchanger 3 is used as the condenser during the defrosting operation. That is, in the air heat exchanger 3, condensation heat of refrigerant flowing through the air heat exchanger 3 is transferred to frost adhering to the surface of the air heat exchanger 3. With such transfer of condensation heat, refrigerant flowing through the air heat exchanger 3 condenses, thus becoming liquid refrigerant at high pressure. Further, frost adhering to the surface of the air heat exchanger 3 is melt by heat transferred from the refrigerant.

The liquid refrigerant at high pressure, which is condensed in the air heat exchanger 3, flows into the first expansion valve 6. The refrigerant that flows into the first expansion valve 6 is reduced in pressure, and is discharged from the first expansion valve 6 as two-phase refrigerant at low pressure.

A portion of the refrigerant at low pressure discharged from the first expansion valve 6 flows through the first refrigerant pipe 8, and then flows into the internal heat exchanger 5. The remaining portion of the refrigerant at low pressure discharged from the first expansion valve 6 flows into the injection pipe 17 from the branch portion 15, and is further reduced in pressure by the second expansion valve 18. In the internal heat exchanger 5, the refrigerant flowing through the first refrigerant pipe 8 exchanges heat with the refrigerant reduced in pressure by the second expansion valve 18, and is thus subcooled and hence brought into a liquid state. The refrigerant is discharged from the internal heat exchanger 5 as liquid refrigerant, and flows through the first refrigerant pipe 8, and then flows through the extension pipe 10, and flows into the refrigerant flow passage of the water heat exchanger 4. In contrast, the two-phase refrigerant reduced in pressure by the second expansion valve 18 exchanges heat with the refrigerant in the internal heat exchanger 5 and, subsequently, flows into the compression chamber of the compressor 1 from the injection port 16.

The water heat exchanger 4 is used as the evaporator during the defrosting operation. That is, in the water heat exchanger 4, heat exchange is performed between refrigerant flowing through the refrigerant flow passage and water flowing through the water pipe 30, and evaporation heat of the refrigerant is removed from the water. With such removal of evaporation heat, the refrigerant flowing through the refrigerant flow passage of the water heat exchanger 4 is evaporated, thus becoming gas refrigerant at low temperature. This gas refrigerant passes through the extension pipe 9 and the flow passage switching device 2, and is then suctioned into the compressor 1.

The refrigerant suctioned into the compressor 1 merges with refrigerant that flows into the compressor 1 from the injection port 16, and is compressed, thus becoming gas refrigerant at high temperature and high pressure. The above-described cycle is continuously repeated during the defrosting operation.

<Cooling Operation>

During the cooling operation, the opening degree of the second expansion valve 18 is controlled to 0, that is, to a fully closed state. Therefore, refrigerant does not flow through the injection pipe 17 and hence, the refrigerant is not injected into the compressor 1. The other flows of refrigerant are substantially equal to those in the defrosting operation.

<Operation Control>

Figure 2:
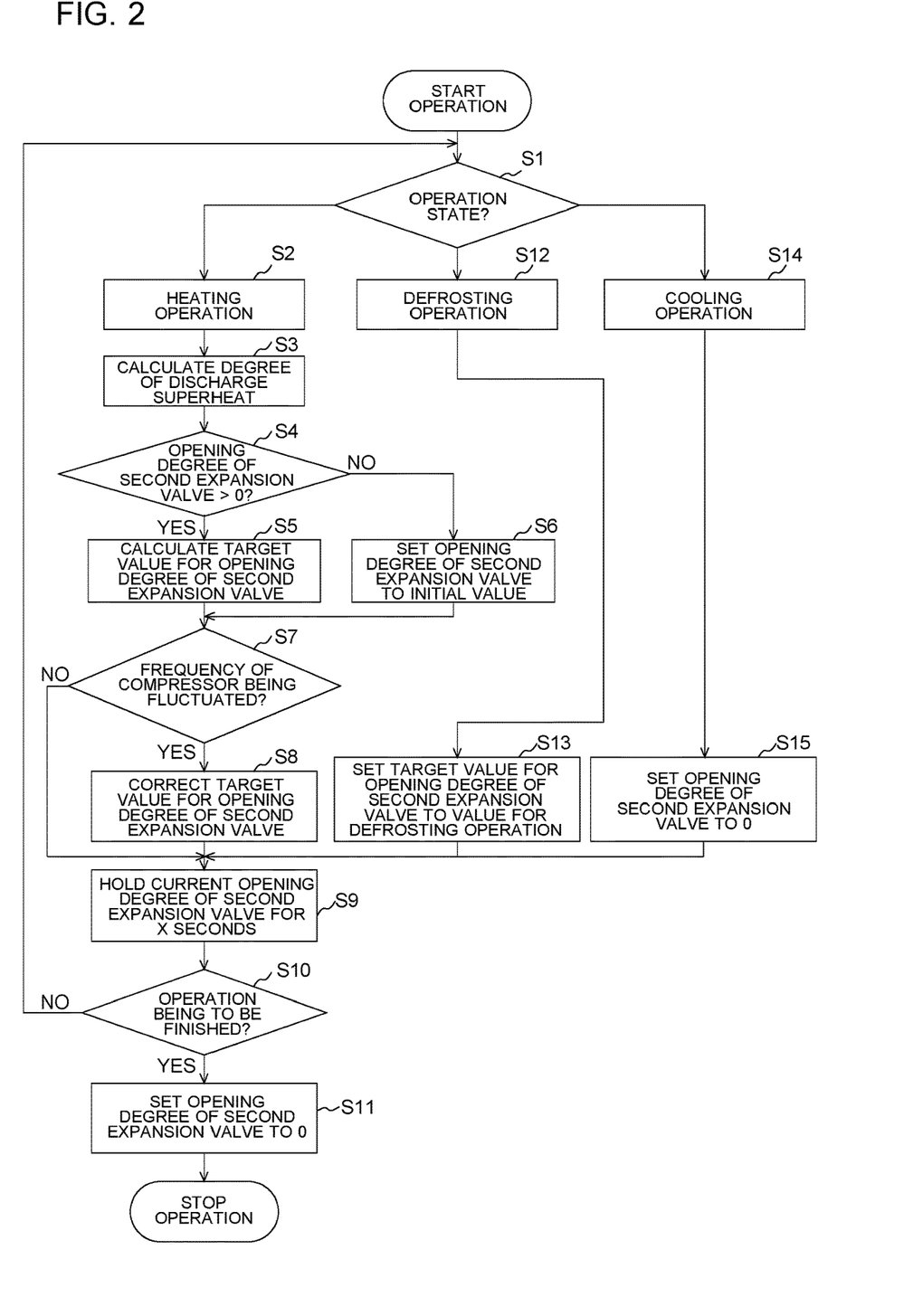
FIG. 2 is a flowchart for describing an operation control of the refrigeration cycle apparatus 100 according to Embodiment 1.

Next, operation control of the refrigeration cycle apparatus 100 will be described. FIG. 2 is a flowchart for describing operation control of the refrigeration cycle apparatus 100 according to Embodiment 1. In Embodiment 1, operation control shown in FIG. 2 is exercised by the controller 24.

In step S1, the operation state of the refrigeration cycle apparatus 100 is determined. When the operation state of the refrigeration cycle apparatus 100 is the heating operation, the processing advances to step S2. When the operation state of the refrigeration cycle apparatus 100 is the defrosting operation, the processing advances to step S12. When the operation state of the refrigeration cycle apparatus 100 is the cooling operation, the processing advances to step S14.

In the case of the heating operation (step S2), the degree of discharge superheat SHd is calculated in step S3. The degree of discharge superheat SHd is calculated by subtracting a high pressure saturation temperature from the temperature of refrigerant discharged from the compressor 1. The temperature of discharged refrigerant is detected by the temperature sensor 21 in Embodiment 1. The controller 24 stores, for example, the values of the pressures of discharged refrigerant and the values of high pressure saturation temperatures corresponding to the pressures of the discharged refrigerant in an associated manner. The value of a high pressure saturation temperature corresponding to the pressure of discharged refrigerant, which is detected by the pressure sensor 22, is used for calculating the degree of discharge superheat SHd.

In step S4, it is determined whether the current opening degree of the second expansion valve 18 is greater than 0, that is, whether the second expansion valve 18 is in an open state. When the current opening degree of the second expansion valve 18 is greater than 0 (YES in step S4), the processing advances to step S5. When the current opening degree of the second expansion valve 18 is not greater than 0, that is, the second expansion valve 18 is in a fully closed state (NO in step S4), the processing advances to step S6.

In step S5, the target value for the opening degree of the second expansion valve 18 is calculated. The target value for the opening degree of the second expansion valve 18 is calculated by the following formula (1).

$$\text{Target value for opening degree} = \text{current opening degree} + (SHd - SHdm) \times \alpha \quad (1)$$

In the formula (1), the target degree of discharge superheat SHdm is a target value for the degree of discharge superheat SHd. Symbol "α" denotes a correction coefficient. The correction coefficient α is set in accordance with the specifications of the refrigeration cycle apparatus 100.

The target degree of discharge superheat SHdm does not have to be necessarily one value, and may be values within a certain range. For example, in the case where refrigerant is R32 or R410A, the target degree of discharge superheat SHdm may be values within a range from 10 degrees C. to 40 degrees C. Further, the value of the target degree of discharge superheat SHdm may be set to a greater value as the pressure of discharged refrigerant detected by the pressure sensor 22 of the compressor 1 is greater. When the value of the target degree of discharge superheat SHdm is set to the greater value in this manner, as can be understood from the formula (1), the target value for the opening degree of the second expansion valve 18 is a smaller value. When the opening degree of the second expansion valve 18 is reduced, it is possible to increase the degree of subcooling of refrigerant flowing through the first refrigerant pipe 8 in the internal heat exchanger 5 and hence, it is possible to increase the difference in specific enthalpy between an inlet and an outlet of the air heat exchanger 3 for refrigerant. The value of the target degree of discharge superheat SHdm may be set such that as the pressure of discharged refrigerant detected by the pressure sensor 22 increases, the value of the target degree of discharge superheat SHdm increases linearly, or the value of the target degree of discharge superheat SHdm increases in a stepwise manner.

In step S6, the target value for the opening degree of the second expansion valve 18 is set to an initial value. The opening degree of the second expansion valve 18 at the time of starting the heating operation is 0. Accordingly, the first determination in step S4 after the heating operation is started is NO, and the initial value (greater than 0) is set as the target value for the opening degree of the second expansion valve 18 in step S6.

In step S7, it is determined whether the frequency of the compressor 1 fluctuates compared with that in step S7 in the previous cycle. When the frequency of the compressor 1 is fluctuated (YES in step S7), the processing advances to step S8. When the frequency of the compressor 1 does not fluctuate (NO in step S7), the processing advances to step S9. In the case where step S7 is executed the first time after the heating operation is started, no frequency value is available for the comparison target and hence, the determination in step S7 is NO.

In step S8, the target value for the opening degree of the second expansion valve 18, which is set in step S5 or step S6, is corrected. The target value for the opening degree of the second expansion valve 18 is corrected by the following formula (2), for example.

$$\text{Corrected target value for opening degree} = \text{target value for opening degree before correction} + (1 - \text{frequency in previous cycle/current frequency}) \times \beta \quad (2)$$

In the formula (2), symbol "β" denotes a correction coefficient. The correction coefficient β is set in accordance with the specifications of the refrigeration cycle apparatus 100.

In step S9, the opening degree of the second expansion valve 18 is controlled to the target value for the opening degree, and such a state is held for X seconds. A value of the X seconds is not specifically limited. However, the X seconds may be 60 seconds, for example. During a period of X seconds in which the opening degree of the second expansion valve 18 is maintained, as shown in FIG. 1, refrigerant flows through the injection pipe 17, and the refrigerant is injected into the injection port 16. When the target value for the opening degree of the second expansion valve 18 is set in step S5, during the execution of step S9, the degree of discharge superheat SHd approaches the target degree of discharge superheat SHdm. When the target value for the opening degree of the second expansion valve 18 is corrected in step S8, during the execution of step S9, the value of the degree of discharge superheat SHd is controlled more stably. After a lapse of the X seconds, the processing advances to step S10.

In step S10, it is determined whether the operation is to be finished. When the operation is not to be finished (NO in step S10), the processing returns to step S1. When the operation is to be finished (YES in step S10), the processing advances to step S11.

In step S11, the opening degree of the second expansion valve 18 is set to 0. That is, the second expansion valve 18 is controlled to a fully closed state. With such an operation, a state is brought about where refrigerant does not flow through the injection pipe 17. Then, the operation is stopped.

In the case of the defrosting operation (step S12), in step S13, the target value for the opening degree of the second expansion valve 18 is set to a value for the defrosting operation. The value of the opening degree of the second expansion valve 18 for the defrosting operation is set to a value greater than the target value for the opening degree of the second expansion valve 18 during the heating operation. The reason of such setting is as follows. The saturation temperature of refrigerant at high pressure during the defrosting operation is equal to the melting temperature of water and hence, the pressure of refrigerant at high pressure (discharged refrigerant) is lower than that during the heating operation and the pressure at the injection port 16 is further reduced correspondingly.

To ensure reliability of the compressor 1, the target value for the opening degree of the second expansion valve 18 may be set to a value at which the degree of discharge superheat SHd is not lower than 10 degrees C. Specifically, for example, after step S13, the degree of discharge superheat SHd is calculated in the same manner as step S3. Then, the target value for the opening degree of the second expansion valve 18 is corrected on the basis of the value of this degree of discharge superheat SHd.

When the target value for the opening degree of the second expansion valve 18 is set in step S13, the processing advances to step S9. The processing after step S9 is as described above.

In the case of the cooling operation (step S14), in step S15, the opening degree of the second expansion valve 18 is set to 0. That is, the second expansion valve 18 is controlled to a fully closed state. Refrigerant does not flow through the injection pipe 17 and hence, the refrigerant is not injected into the compressor 1. As described above, injection into the compressor 1 is not performed during the cooling operation and hence, an increase in input caused by pressure pulsation of the compressor 1 is reduced and the coefficient of performance of the refrigeration cycle apparatus 100 is thus improved.

In FIG. 2, the description has been made for the case where refrigerant is injected into the compressor 1 during the heating operation. However, in the case where the heating operation is performed in a low load state, the second expansion valve 18 may be set to a fully closed state such that refrigerant is not injected into the compressor 1. By performing no injection into the compressor 1 as described above, an increase in input caused by pressure pulsation of the compressor 1 is reduced and hence, the coefficient of performance of the refrigeration cycle apparatus 100 is improved.

<Manner of Operation of Refrigeration Cycle Apparatus 100>

Figure 3:
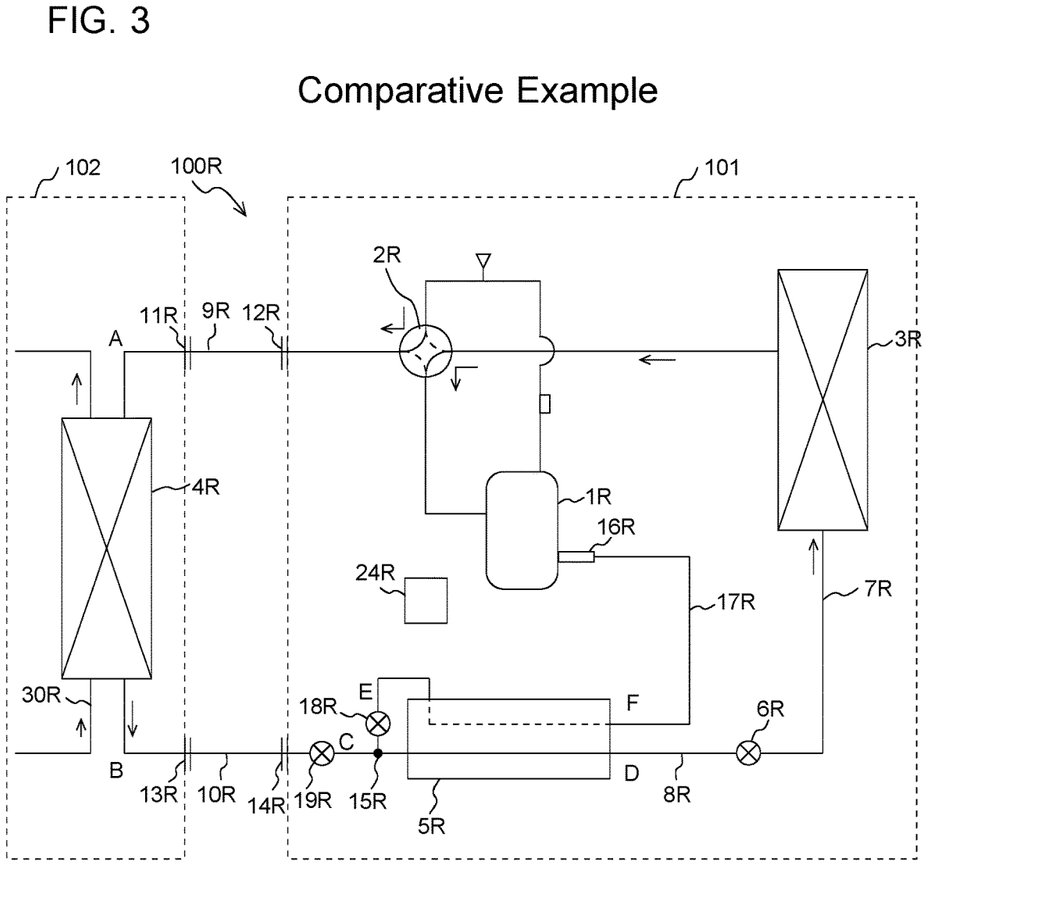
FIG. 3 is a configuration diagram of a refrigeration cycle apparatus 100R according to a comparative example.

Next, the manner of operation of the refrigeration cycle apparatus 100 of Embodiment 1 will be described. In Embodiment 1, as described above, refrigerant is branched at a position downstream of the internal heat exchanger 5 in the flow direction of refrigerant in the heating operation, and the refrigerant is caused to flow into the injection pipe 17. To describe the manner of operation in Embodiment 1, first, a refrigeration cycle apparatus 100R according to a comparative example and a Mollier diagram of the refrigeration cycle apparatus 100R will be described.

FIG. 3 is a configuration diagram of the refrigeration cycle apparatus 100R according to the comparative example. Of the components forming the refrigeration cycle apparatus 100R, components corresponding to the components shown in FIG. 1 are given reference signs including the same numerical number as that used in FIG. 1 with the suffix R. In FIG. 3, the flow of refrigerant during the heating operation is shown by solid line arrows. In the refrigeration cycle apparatus 100R, a branch portion 15R is provided downstream of a water heat exchanger 4R and upstream of an internal heat exchanger 5R in the flow direction of refrigerant in the heating operation. A third expansion valve 19R is provided downstream of the water heat exchanger 4R and upstream of the branch portion 15R.

Figure 4:
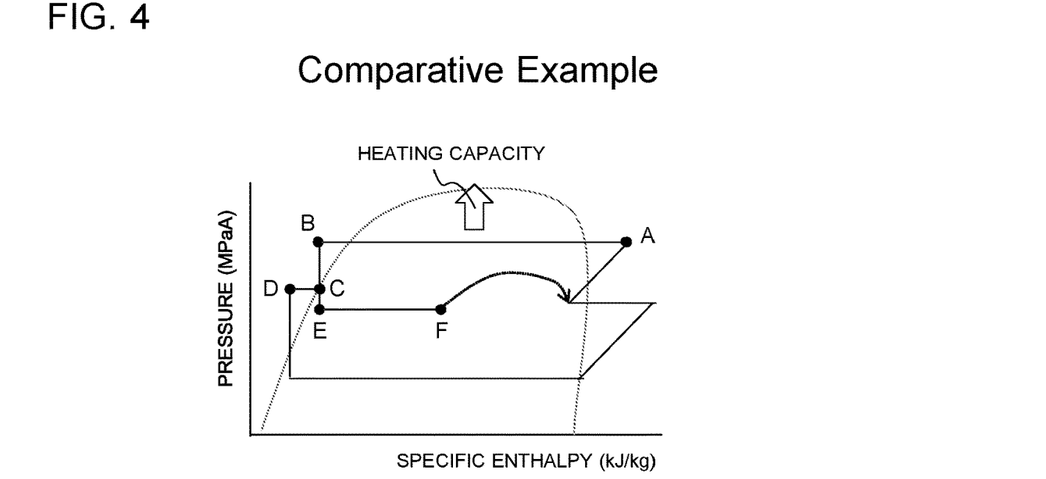
FIG. 4 is a Mollier diagram of a heating operation of the refrigeration cycle apparatus 100R according to the comparative example.

FIG. 4 is a Mollier diagram of the heating operation of the refrigeration cycle apparatus 100R according to the comparative example. In FIG. 4, points A, B, C, D, E, F respectively indicate states of refrigerant at points A, B, C, D, E, F in FIG. 3. Refrigerant discharged from compressor 1R (point A) is condensed in the water heat exchanger 4R while maintaining high pressure (point B). The refrigerant at high pressure and low temperature discharged from the water heat exchanger 4R is reduced in pressure by the third expansion valve 19R (point C). Of the refrigerant discharged from the third expansion valve 19R, a portion of the refrigerant flows through a first refrigerant pipe 8R and flows into the internal heat exchanger 5R. The remaining portion of the refrigerant flows into an injection pipe 17R, and is reduced in pressure by a second expansion valve 18R (point E). The refrigerant flowing through the first refrigerant pipe 8R in the internal heat exchanger 5R is subcooled because of heat exchange with the refrigerant flowing through the injection pipe 17R and hence, specific enthalpy is reduced. In FIG. 4, the state change of refrigerant flowing through the first refrigerant pipe 8R in the internal heat exchanger 5R is expressed as a state change from point C to point D. In contrast, the refrigerant flowing through the injection pipe 17R in the internal heat exchanger 5R increases in specific enthalpy because of heat exchange with the refrigerant flowing through the first refrigerant pipe 8R. In FIG. 4, the state change of the refrigerant flowing through the injection pipe 17R in the internal heat exchanger 5R is expressed as a state change from point E to point F.

Figure 5:
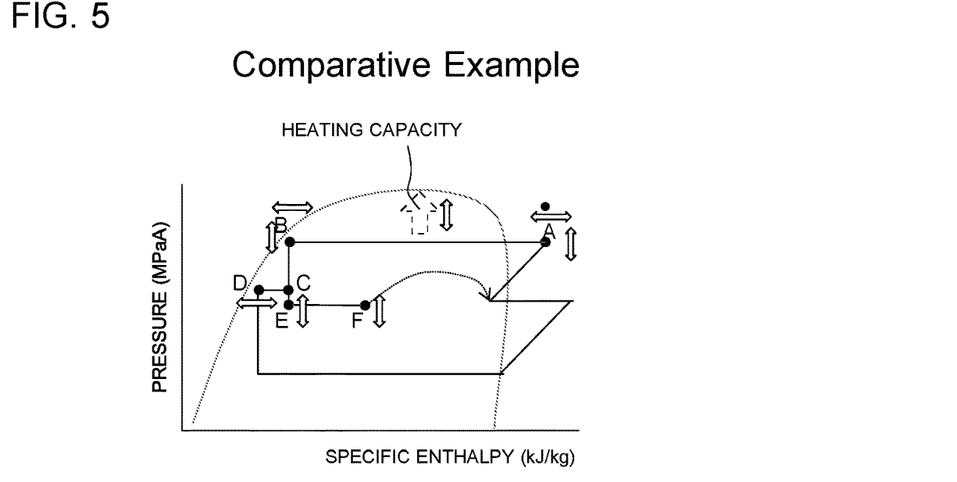
FIG. 5 is a Mollier diagram of the heating operation of the refrigeration cycle apparatus 100R according to the comparative example in a state in which the amount of refrigerant is insufficient.

In the case of the refrigeration cycle apparatus 100R according to the comparative example, the state of refrigerant transitions as shown in FIG. 4 when the operation state is ideal. However, in the case where the amount of refrigerant is insufficient, the operation in the state shown in FIG. 4 is not performed stably. The amount of refrigerant required for the refrigeration cycle apparatus 100R is different for the lengths of the extension pipe 9R and the extension pipe 10R. The lengths of the extension pipe 9R and the extension pipe 10R are different for each environment where the refrigeration cycle apparatus 100R is installed, and the amount of refrigerant sealed may be suitably set at the time of installation of the refrigeration cycle apparatus 100R. Therefore, it is also possible to consider that the amount of refrigerant in the refrigeration cycle apparatus 100R is insufficient. FIG. 5 is a Mollier diagram of the heating operation of the refrigeration cycle apparatus 100R according to the comparative example in a state in which the amount of refrigerant is insufficient. In the case where the amount of refrigerant is insufficient, refrigerant flowing into the injection pipe 17R (point C) is brought into a two-phase state and hence, the amount of refrigerant flowing into an injection port 16R via the injection pipe 17R is unstable. Accordingly, the amount of refrigerant is unstable between point E and point F, and between point C and point D, and the amount of refrigerant is also unstable between point A and point B correspondingly. The difference in specific enthalpy between point A and point B and the cycle amount of refrigerant in the water heat exchanger 4R, which is the condenser, represent the heating capacity. Therefore, when the refrigeration cycle apparatus 100R of the comparative example is brought into the operation state shown in FIG. 5, comfort in an air-conditioned space is reduced, and energy efficiency is also reduced.

Figure 6:
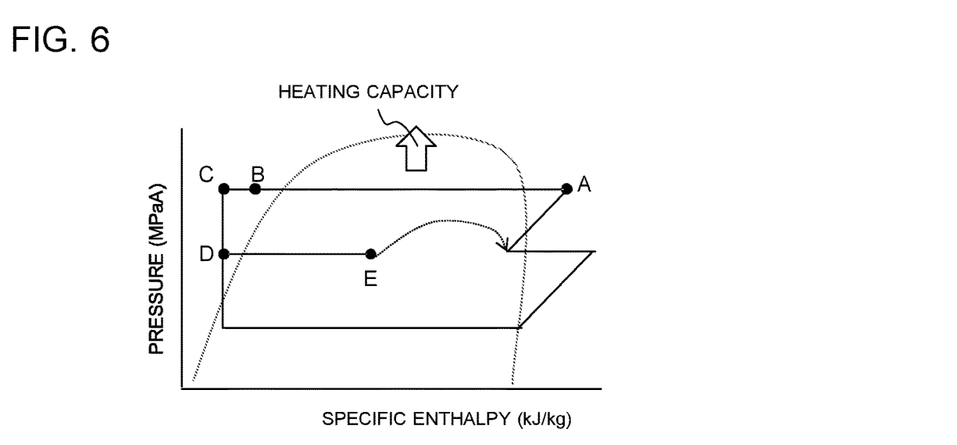
FIG. 6 is a Mollier diagram for describing the state of refrigerant during a heating operation of the refrigeration cycle apparatus 100 according to Embodiment 1.

FIG. 6 is a Mollier diagram for describing the state of refrigerant during the heating operation of the refrigeration cycle apparatus 100 according to Embodiment 1. In FIG. 6, points A, B, C, D, E respectively indicate states of refrigerant at points A, B, C, D, E in FIG. 1. Immediately after injection is started and the second expansion valve 18 is opened, heat exchange is not sufficiently performed in the internal heat exchanger 5 between refrigerant flowing through the first refrigerant pipe 8 and refrigerant flowing through the injection pipe 17 and hence, the state of refrigerant at point C is substantially equal to the state of refrigerant at point B. However, when injection is continued, as shown in FIG. 6, refrigerant discharged from the water heat exchanger 4 and flowing through the internal heat exchanger 5 toward the branch portion 15 is brought into a subcooled state at point C. The subcooled refrigerant at point C is caused to flow into the injection pipe 17 and hence, it is possible to stabilize the amount of refrigerant injected into the compressor 1. With such a configuration, it is possible to stabilize the cycle amount of refrigerant in the water heat exchanger 4, which is the condenser.

Figure 7:
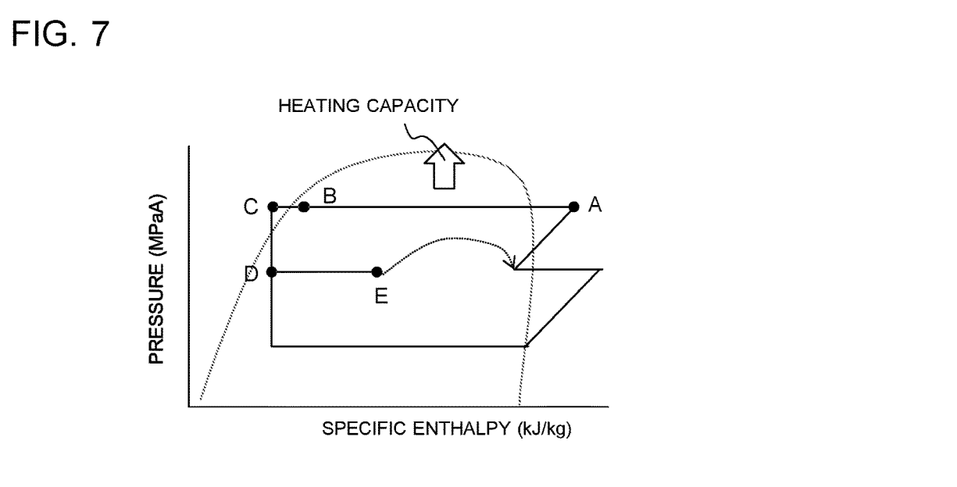
FIG. 7 is a Mollier diagram for describing the state of refrigerant during the heating operation of the refrigeration cycle apparatus 100 according to Embodiment 1 in a state in which the amount of refrigerant is insufficient.

FIG. 7 is a Mollier diagram for describing the state of refrigerant during the heating operation of the refrigeration cycle apparatus 100 according to Embodiment 1 in a state in which the amount of refrigerant is insufficient. Even when the amount of refrigerant in the refrigeration cycle apparatus 100 is insufficient, as described above, refrigerant discharged from the water heat exchanger 4 and flowing through the internal heat exchanger 5 toward the branch portion 15 is brought into a subcooled state at point C, and flows into the injection pipe 17. Therefore, even when the amount of refrigerant is insufficient, the refrigeration cycle apparatus 100 demonstrates heating capacity stably, and reduces the lowering of comfort and energy efficiency.

Figure 8:
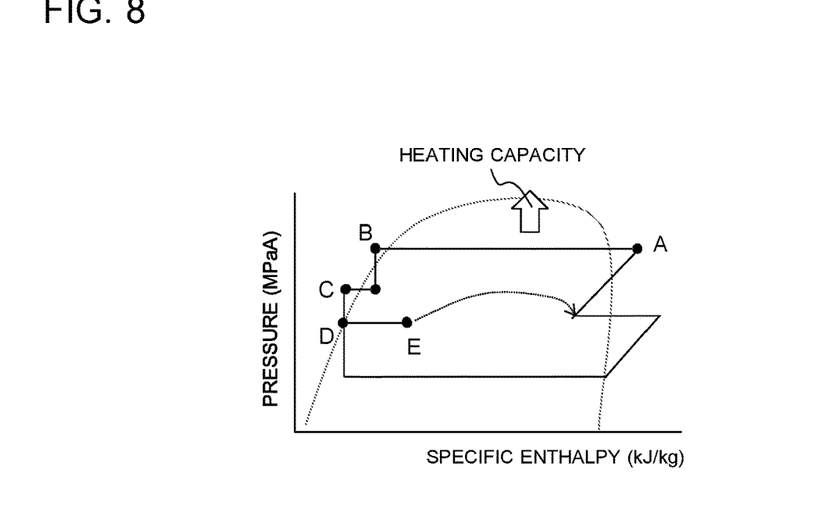
FIG. 8 is a Mollier diagram for describing the state of refrigerant during the heating operation of the refrigeration cycle apparatus 100 according to Embodiment 1 in a state in which extension pipes 9, 10 have large lengths.

FIG. 8 is a Mollier diagram for describing the state of refrigerant during the heating operation of the refrigeration cycle apparatus 100 according to Embodiment 1 in a state in which the extension pipes 9, 10 have a large length. The description will be made, with reference to FIG. 8, for the manner of operation in the case where the refrigeration cycle apparatus 100 includes the extension pipes 9, 10 having a larger length than the extension pipes 9, 10 of the example shown in FIGS. 6, 7.

When the lengths of the extension pipes 9, 10 are larger, refrigerant is also larger in pressure loss in the course of flowing through the extension pipes 9, 10. When a comparison is made between the pressure of refrigerant at point B, which is the refrigerant after discharged from the water heat exchanger 4 and before entering the extension pipe 10, and the pressure of refrigerant at point C, which is the refrigerant that passed through the extension pipe 10 and the internal heat exchanger 5, point C has the lower pressure of refrigerant than does point B. In the case of the configuration according to the comparative example shown in FIG. 3 to FIG. 5, refrigerant flowing into the injection pipe 17R is in the two-phase state as described above. Therefore, it is difficult to stably control the amount of refrigerant supplied to the injection port 16R by the second expansion valve 18R. However, according to Embodiment 1, the branch portion 15 is provided downstream of the internal heat exchanger 5 and upstream of the first expansion valve 6 in the flow direction of refrigerant in the heating operation. At the branch portion 15, the injection pipe 17 is branched from the first refrigerant pipe 8. Therefore, as shown in FIG. 8, it is possible to bring refrigerant flowing into the injection pipe 17 from the branch portion 15 into a liquid state. Even when the extension pipes 9, 10 have a large length, stability of the amount of refrigerant injected into the compressor 1 from the injection port 16 is thus not easily lowered and hence, it is possible to stabilize the cycle amount of refrigerant in the water heat exchanger 4, which is the condenser.

The degree of discharge superheat SHd at point A in FIG. 1 is affected by the lengths of the extension pipes 9, 10. Therefore, by controlling the value of the target degree of discharge superheat SHdm by regulating the opening degree of the second expansion valve 18, it is possible to ensure reliability of the compressor 1, and to supply heating capacity stably. It is also possible to achieve a refrigeration cycle having high stability.

Next, the manner of operation during the defrosting operation will be described. As shown in FIG. 1, the injection pipe 17 is branched from the branch portion 15 located upstream of the internal heat exchanger 5 in the flow direction of refrigerant in the defrosting operation. Therefore, refrigerant in a two-phase state that is refrigerant before subcooled in the internal heat exchanger 5 is allowed to be caused to flow into the injection port 16 of the compressor 1 through the injection pipe 17. When refrigerant subjected to pass through the internal heat exchanger 5 is caused to flow into the injection pipe 17, refrigerant having pressure loss caused in the course of passing through the internal heat exchanger 5 flows into the injection pipe 17, so that the amount of refrigerant injected is also reduced. However, in Embodiment 1, refrigerant having no pressure loss caused by passing through the internal heat exchanger 5 is allowed to be caused to flow into the injection pipe 17. With such a configuration, it is possible to increase the amount of refrigerant cycling through the air heat exchanger 3, which is an object to be defrosted, and hence, defrosting time is shortened. When defrosting time is prolonged, the temperature of water in the water pipe 30 exchanging heat with refrigerant at low temperature in the water heat exchanger 4 reduces and hence, the water pipe 30 freezes, thus leading to failure of the refrigeration cycle apparatus 100. However, according to Embodiment 1, during the defrosting operation, defrosting time is shortened by increasing the amount of refrigerant cycling through the air heat exchanger 3 and hence, it is possible to reduce freezing of the water heat exchanger 4.

As has been described above, the refrigeration cycle apparatus 100 according to Embodiment 1 includes the compressor 1 having the injection port 16 and discharging compressed refrigerant, the air heat exchanger 3 causing air and refrigerant to exchange heat with each other, the first expansion valve 6, and the water heat exchanger 4 causing water and refrigerant to exchange heat with each other. The flow passage switching device 2 is provided to a discharge part of the compressor 1 and is switched between the first state in which refrigerant discharged from the compressor 1 is caused to flow into the water heat exchanger 4 and the second state in which refrigerant discharged from the compressor 1 is caused to flow into the air heat exchanger 3. Further, the injection pipe 17 is provided. The injection pipe 17 is branched from the branch portion 15 of the first refrigerant pipe 8 connecting the water heat exchanger 4 with the first expansion valve 6, and the injection pipe 17 is connected to the injection port 16. The second expansion valve 18 is provided to the injection pipe 17. The internal heat exchanger 5 is also provided. The internal heat exchanger 5 causes refrigerant flowing between the water heat exchanger 4 and the branch portion 15 and refrigerant flowing through the injection pipe 17 and expanded in the second expansion valve 18 to exchange heat with each other. At the branch portion 15, the injection pipe 17 is branched from the first refrigerant pipe 8, and the branch portion 15 is provided downstream of the internal heat exchanger 5 and upstream of the first expansion valve 6 in the flow direction of refrigerant when the flow passage switching device 2 is operated in the first state.

According to Embodiment 1, refrigerant is branched at a position downstream of the internal heat exchanger 5 in the flow direction of refrigerant in the operation state in which refrigerant discharged from the compressor 1 is caused to flow into the water heat exchanger 4, and the branched refrigerant is caused to flow into the injection pipe 17. That is, when refrigerant flows through the internal heat exchanger 5 from the water heat exchanger 4 toward the first expansion valve 6, the refrigerant is caused to exchange heat with refrigerant that is reduced in pressure by the second expansion valve 18 of the injection pipe 17 and hence, the refrigerant that flows through the internal heat exchanger 5 is liquefied, and the liquefied refrigerant is allowed to be caused to flow into the injection pipe 17. Liquid refrigerant is allowed to be caused to flow into the injection pipe 17 and hence, it is possible to stably control the amount of refrigerant caused to flow into the injection port 16 of the compressor 1 by using the second expansion valve 18.

Further, during the heating operation during which the flow passage switching device 2 is operated in the first state, the controller 24 controls the opening degree of the second expansion valve 18 such that the degree of discharge superheat SHd that is obtained from the detected value from the temperature sensor 21 and the detected value from the pressure sensor 22 approaches the target degree of discharge superheat SHdm. Therefore, even when the extension pipes 9, 10 have different lengths because of installation environment of the refrigeration cycle apparatus 100, or even when the amount of refrigerant in the refrigeration cycle apparatus 100 varies, it is possible to obtain heating capacity stably.

Embodiment 2

In Embodiment 2, another method for controlling the target degree of discharge superheat SHdm, which is different from the method described in Embodiment 1, will be described. In Embodiment 2, the description will be made for another example of control of the opening degree of the second expansion valve 18 during the defrosting operation in addition to another method for controlling the target degree of discharge superheat SHdm. Embodiment 2 may be used in combination with Embodiment 1. In Embodiment 2, points making Embodiment 2 different from Embodiment 1 will be mainly described.

Figure 9:
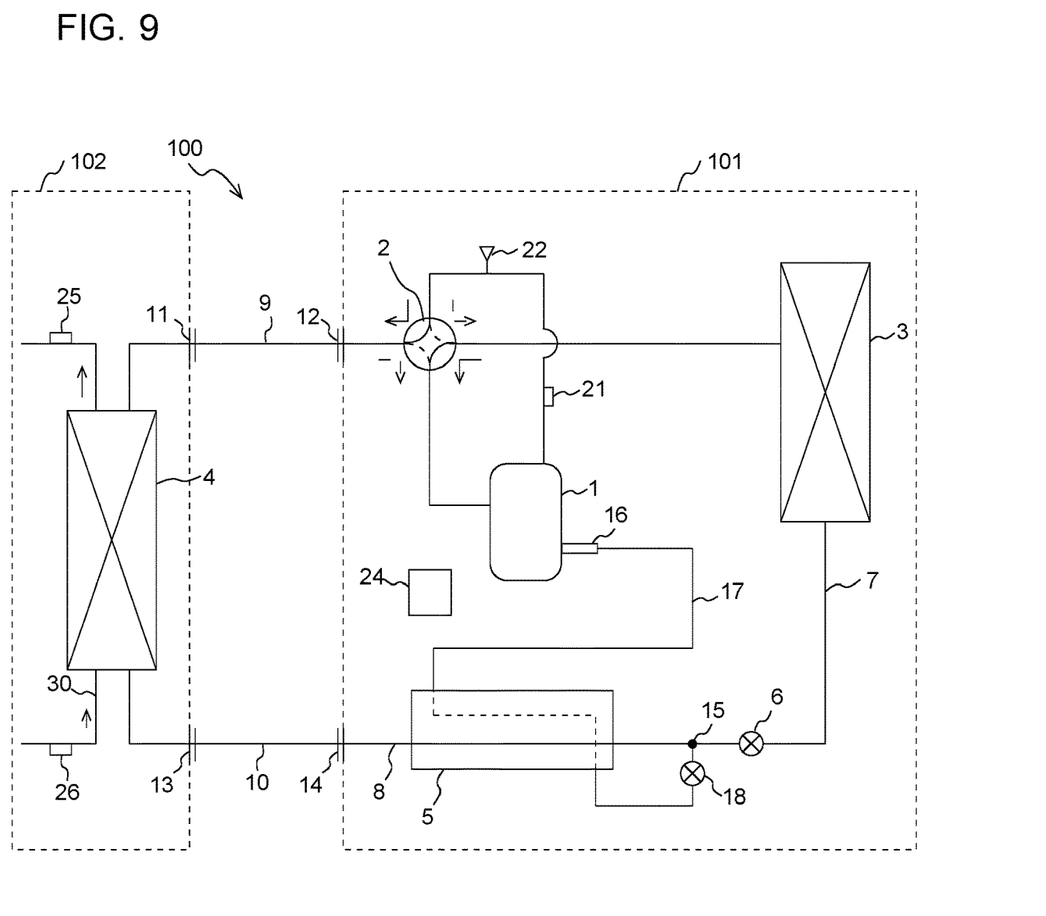
FIG. 9 is a configuration diagram of a refrigeration cycle apparatus 100 according to Embodiment 2.

FIG. 9 is a configuration diagram of a refrigeration cycle apparatus 100 according to Embodiment 2. The refrigeration cycle apparatus 100 of Embodiment 2 is provided with a first water temperature sensor 25. The first water temperature sensor 25 is provided to the water pipe 30 and to an outlet port of the water heat exchanger 4. The first water temperature sensor 25 detects the temperature of water flowing out from the water heat exchanger 4. That is, the first water temperature sensor 25 detects the temperature of water subjected to heat exchange with refrigerant in the water heat exchanger 4. A value detected by the first water temperature sensor 25 is input into the controller 24. The controller 24 regulates the target degree of discharge superheat SHdm as will be described later on the basis of the input detected value from the first water temperature sensor 25.

The refrigeration cycle apparatus 100 of Embodiment 2 is also provided with a second water temperature sensor 26. The second water temperature sensor 26 is provided to the water pipe 30 and to an inlet port of the water heat exchanger 4. The second water temperature sensor 26 detects the temperature of water flowing into the water heat exchanger 4. That is, the second water temperature sensor 26 detects the temperature of water before the water exchanges heat with refrigerant in the water heat exchanger 4. A value detected by the second water temperature sensor 26 is input into the controller 24. The controller 24 controls the opening degree of the second expansion valve 18 during the defrosting operation as will be described later on the basis of the input detected value from the second water temperature sensor 26.

<Regulation of Target Degree of Discharge Superheat SHdm>

Figure 10:
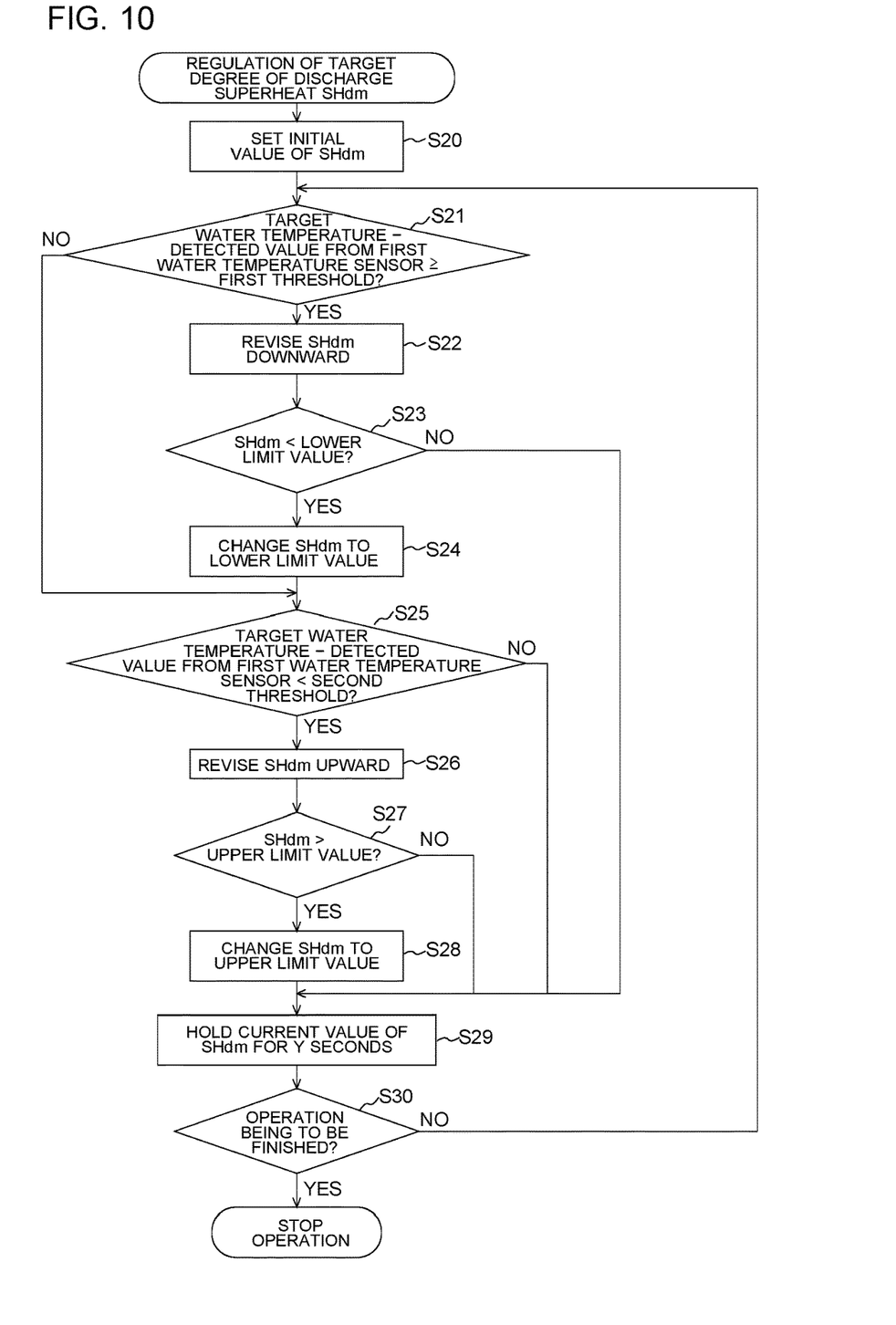
FIG. 10 is a flowchart for describing regulation control of a target degree of discharge superheat SHdm according to Embodiment 2.

In the above-described Embodiment 1, the description has been made for the case where, in the heating operation, the target value for the opening degree of the second expansion valve 18 is calculated in step S5 shown in FIG. 2. Further, it is exemplified by the formula (1) that the target degree of discharge superheat SHdm is used for calculating the target value for the opening degree of the second expansion valve 18. In Embodiment 2, the description will be made for the case where this target degree of discharge superheat SHdm is regulated by using the temperature of water flowing out from the water heat exchanger 4. FIG. 10 is a flowchart for describing regulation control of the target degree of discharge superheat SHdm according to Embodiment 2.

The initial value of the target degree of discharge superheat SHdm is set in step S20 and then, the processing advances to step S21.

In step S21, it is determined whether the difference between the value of a target water temperature, which is the target value for the temperature of water flowing out from the water heat exchanger 4, and the detected value from the first water temperature sensor 25 is more than or equal to a first threshold. The value of the first threshold is not specifically limited, but may be 3 degrees C., for example. When the difference is more than or equal to the first threshold (YES in step S21), the processing advances to step S22. When the difference is less than the first threshold (NO in step S21), the processing advances to step S25.

In step S22, the target degree of discharge superheat SHdm is revised downward. However, it is necessary to ensure that the target degree of discharge superheat SHdm is not lower than the lower limit value. Therefore, in step S23, a comparison is made between the target degree of discharge superheat SHdm, which is set in step S22, and the lower limit value. When the target degree of discharge superheat SHdm is lower than the lower limit value (YES in step S23), the target degree of discharge superheat SHdm is changed to the lower limit value in step S24. When the target degree of discharge superheat SHdm is not lower than the lower limit value (NO in step S23), the processing advances to step S29. The lower limit value of the target degree of discharge superheat SHdm may be 10 degrees C., for example.

By reducing the target degree of discharge superheat SHdm in steps S22 to S24 as described above, as can be understood from the formula (1) shown in Embodiment 1, the target value for the opening degree of the second expansion valve 18 is allowed to be increased. When the opening degree of the second expansion valve 18 is increased, the degree of discharge superheat SHd of the compressor 1 reduces and hence, an input into the compressor 1 increases. The case where the difference between the target water temperature and the detected value from the first water temperature sensor 25 is greater than the first threshold in step S21 is a situation where the temperature of water supplied to an air-conditioned space from the water heat exchanger 4 through the water pipe 30 is significantly lower than the target value, that is, a situation where heating capacity required for the refrigeration cycle apparatus 100 is insufficient. Therefore, the amount of refrigerant injected into the compressor 1 is increased by increasing the opening degree of the second expansion valve 18 to increase heating capacity. With such operations, it is possible to supply water at a desired temperature to the air-conditioned space.

In step S25, it is determined whether the difference between the value of the target water temperature and the detected value from the first water temperature sensor 25 is lower than a second threshold. The second threshold is a value smaller than the first threshold. The value of the second threshold is not specifically limited. However, when the first threshold is 3 degrees C., the second threshold may be 1.5 degrees C., for example. When the difference is less than the second threshold (YES in step S25), the processing advances to step S26. When the difference is greater than or equal to the second threshold (NO in step S25), the processing advances to step S29.

In step S26, the target degree of discharge superheat SHdm is revised upward. However, it is necessary to ensure that the target degree of discharge superheat SHdm does not exceed the upper limit value. Therefore, in step S27, when the target degree of discharge superheat SHdm set in step S26 is greater than the upper limit value (YES in step S27), the target degree of discharge superheat SHdm is changed to the upper limit value in step S28. When the target degree of discharge superheat SHdm is not greater than the upper limit value (NO in step S27), the processing advances to step S29. The upper limit value of the target degree of discharge superheat SHdm may be 35 degrees C., for example.

By causing the target degree of discharge superheat SHdm to rise in steps S26 to S28 as described above, as can be understood from the formula (1) shown in Embodiment 1, the target value for the opening degree of the second expansion valve 18 is allowed to be reduced. When the opening degree of the second expansion valve 18 is reduced, the amount of refrigerant injected into the compressor 1 reduces. The case where the difference between the target water temperature and the detected value from the first water temperature sensor 25 is less than the second threshold in step S25 is a situation where the temperature of water supplied to an air-conditioned space from the water heat exchanger 4 through the water pipe 30 is close to the target value, that is, a situation where the heating capacity of the refrigeration cycle apparatus 100 satisfies the required heating capacity or close to the required heating capacity. Therefore, by reducing the amount of refrigerant injected into the compressor 1 by reducing the opening degree of the second expansion valve 18, the coefficient of performance of the refrigeration cycle apparatus 100 is improved.

In step S29, the current value of the target degree of discharge superheat SHdm is held for Y seconds. During the Y seconds, the arithmetic operation for the target value for the opening degree of the second expansion valve 18 in step S5 shown in FIG. 2 is performed by using the value of the target degree of discharge superheat SHdm held in step S29.

In step S30, it is determined whether the operation is to be finished. When the operation is not to be finished (NO in step S30), the processing returns to step S21. When the operation is to be finished (YES in step S30), the operation is stopped.

The detected value from the second water temperature sensor 26 shown in FIG. 9 is not used in the process of regulating the target degree of discharge superheat SHdm shown in FIG. 10. Therefore, in the case where an object is to regulate the target degree of discharge superheat SHdm, the second water temperature sensor 26 does not have to be provided.

<Control of Opening Degree of Second Expansion Valve 18 During Defrosting Operation>

In the above-described Embodiment 1, the description has been made for the case where the target value for the opening degree of the second expansion valve 18 is set to a value for the defrosting operation in step S13 in FIG. 2 during the defrosting operation. Hereinafter, the description will be made for an example where the target value for the opening degree of the second expansion valve 18 during the defrosting operation is further controlled by using a detected value from the second water temperature sensor 26.

After step S13 in FIG. 2, the detected value from the second water temperature sensor 26 is compared with the threshold. When the detected value from the second water temperature sensor 26 is lower than the threshold, the controller 24 increases the opening degree of the second expansion valve 18. When the detected value from the second water temperature sensor 26 is lower than the threshold, water subjected to heat exchange with refrigerant at low temperature in the water heat exchanger 4 reduces in temperature and, when defrosting time is prolonged, water is likely to freeze in the water pipe 30. Therefore, the amount of refrigerant injected into the compressor 1 is increased by increasing the opening degree of the second expansion valve 18 to increase the amount of refrigerant flowing through the air heat exchanger. With such operations, defrosting capacity is improved and hence, defrosting time is shortened. Accordingly, it is possible to reduce freezing of water in the water heat exchanger 4.

In Embodiments 1, 2, an example where the refrigeration cycle apparatus of the present disclosure is applied to the air-conditioning apparatus has been described. However, the refrigeration cycle apparatus of the present disclosure may also be applied to a water heater that supplies hot water heated by refrigerant in the water heat exchanger 4 to a user.

The invention claimed is:

1. A refrigeration cycle apparatus comprising:
 a compressor having a suction part, a discharge part, and an injection port, and configured to discharge compressed refrigerant;
 an air heat exchanger configured to cause air and the refrigerant to exchange heat with each other;
 a first expansion valve;
 a water heat exchanger configured to cause water and the refrigerant to exchange heat with each other;
 a flow passage switching device provided to a discharge part of the compressor, and configured to be switched between a first state in which the refrigerant discharged from the compressor is caused to flow into the water heat exchanger before being caused to flow into the air heat exchanger and a second state in which the refrigerant discharged from the compressor is caused to flow into the air heat exchanger before being caused to flow into the water heat exchanger;
 an injection pipe branched from a branch portion of a refrigerant pipe connecting the water heat exchanger and the first expansion valve, the injection pipe being connected to the injection port;

a second expansion valve provided to the injection pipe;
an internal heat exchanger configured to cause the refrigerant flowing between the water heat exchanger and the branch portion and the refrigerant flowing out from the second expansion valve and flowing through the injection pipe to exchange heat with each other;
an outdoor unit accommodating the air heat exchanger and the internal heat exchanger;
an indoor unit accommodating the water heat exchanger;
an extension pipe being a portion of a refrigerant pipe connecting the water heat exchanger with the internal heat exchanger, the extension pipe connecting the outdoor unit and the indoor unit;
a temperature sensor configured to detect a temperature of the refrigerant discharged from the compressor;
a pressure sensor configured to detect a pressure of the refrigerant discharged from the compressor; and
a controller configured to control an opening degree of the second expansion valve based on a detected value from the temperature sensor and a detected value from the pressure sensor when the flow passage switching device is operated in the first state,
the branch portion being provided downstream of the internal heat exchanger and upstream of the first expansion valve in a flow direction of the refrigerant when the flow passage switching device is operated in the first state.

2. The refrigeration cycle apparatus of claim 1, wherein the controller is configured to control the opening degree of the second expansion valve such that a degree of discharge superheat obtained from the detected value from the temperature sensor and the detected value from the pressure sensor approaches a target degree of discharge superheat.

3. The refrigeration cycle apparatus of claim 2, wherein the controller is configured to set a value of the target degree of discharge superheat to a greater value as a value of the detected value from the pressure sensor is greater.

4. The refrigeration cycle apparatus of claim 2, comprising a water temperature sensor configured to detect a temperature of water flowing out from the water heat exchanger, wherein
the controller is configured to reduce a value of the target degree of discharge superheat when a difference between a detected value from the water temperature sensor and a target value for the temperature of water flowing out from the water heat exchanger is more than or equal to a first threshold, and
the controller is configured to increase the value of the target degree of discharge superheat when the difference is lower than the first threshold.

5. The refrigeration cycle apparatus of claim 1, wherein the controller is configured to control the second expansion valve such that the opening degree of the second expansion valve during a heating operation in which the flow passage switching device is in the first state and the water heat exchanger is used as a condenser for the refrigerant is smaller than the opening degree of the second expansion valve during a defrosting operation in which the flow passage switching device is in the second state and the air heat exchanger is used as a condenser for the refrigerant.

6. The refrigeration cycle apparatus of claim 1, wherein the internal heat exchanger is located between the water heat exchanger and the first expansion valve.

7. The refrigeration cycle apparatus of claim 1, wherein during a cooling operation in which the flow passage switching device is operated in the second state, the controller is further configured to control the second expansion valve to be fully closed.

8. A refrigeration cycle apparatus comprising:
a compressor having a suction part, a discharge part, and an injection port, and configured to discharge compressed refrigerant;
an air heat exchanger configured to cause air and the refrigerant to exchange heat with each other;
a first expansion valve;
a water heat exchanger configured to cause water and the refrigerant to exchange heat with each other;
a flow passage switching device provided to a discharge part of the compressor, and configured to be switched between a first state in which the refrigerant discharged from the compressor is caused to flow into the water heat exchanger before being caused to flow into the air heat exchanger and a second state in which the refrigerant discharged from the compressor is caused to flow into the air heat exchanger before being caused to flow into the water heat exchanger;
an injection pipe branched from a branch portion of a refrigerant pipe connecting the water heat exchanger and the first expansion valve, the injection pipe being connected to the injection port;
a second expansion valve provided to the injection pipe;
an internal heat exchanger configured to cause the refrigerant flowing between the water heat exchanger and the branch portion and the refrigerant flowing out from the second expansion valve and flowing through the injection pipe to exchange heat with each other;
an outdoor unit accommodating the air heat exchanger and the internal heat exchanger;
an indoor unit accommodating the water heat exchanger; and
an extension pipe being a portion of a refrigerant pipe connecting the water heat exchanger with the internal heat exchanger, the extension pipe connecting the outdoor unit and the indoor unit,
the branch portion being provided downstream of the internal heat exchanger and upstream of the first expansion valve in a flow direction of the refrigerant when the flow passage switching device is operated in the first state, wherein
the internal heat exchanger is located between the water heat exchanger and the branch portion.

9. The refrigeration cycle apparatus of claim 8, wherein the internal heat exchanger is located between the water heat exchanger and the first expansion valve.

10. The refrigeration cycle apparatus of claim 8, further comprising
a controller configured to control the second expansion valve to be fully closed during a cooling operation in which the flow passage switching device is operated in the second state.

* * * * *